United States Patent [19]
Briffe et al.

[11] Patent Number: 6,057,786
[45] Date of Patent: May 2, 2000

[54] APPARATUS AND METHOD FOR AIRCRAFT DISPLAY AND CONTROL INCLUDING HEAD UP DISPLAY

[75] Inventors: Michel Briffe; Guy Mitaux-Maurouard, both of Salon, France

[73] Assignee: Dassault Aviation, France

[21] Appl. No.: 08/950,761

[22] Filed: Oct. 15, 1997

[51] Int. Cl.⁷ .................................................. G01C 23/00
[52] U.S. Cl. ............................... 340/975; 340/974; 701/4
[58] Field of Search ............................. 340/967, 971, 340/973, 974, 975, 976, 977, 978, 979, 980; 701/3, 4, 14; 244/1 R

[56] References Cited

U.S. PATENT DOCUMENTS

| | | | |
|---|---|---|---|
| 4,121,246 | 10/1978 | Fadden et al. | 340/973 |
| 4,860,007 | 8/1989 | Konicke et al. | 340/973 |
| 4,999,782 | 3/1991 | BeVan . | |
| 5,016,177 | 5/1991 | Lambregts | 340/976 |
| 5,041,982 | 8/1991 | Rathnam | 340/995 |
| 5,086,396 | 2/1992 | Waruszewski, Jr. . | |
| 5,179,638 | 1/1993 | Dawson et al. | 395/125 |
| 5,216,611 | 6/1993 | McElreath | 342/413 |
| 5,227,786 | 7/1993 | Hancock | 340/961 |
| 5,287,451 | 2/1994 | Favot et al. | 395/164 |
| 5,289,185 | 2/1994 | Ramier et al. | 340/973 |
| 5,299,417 | 4/1994 | Page et al. | 60/39.282 |
| 5,331,562 | 7/1994 | McGuffin | 342/63 |
| 5,337,982 | 8/1994 | Sherry | 244/186 |
| 5,340,061 | 8/1994 | Vaquier et al. | 244/175 |
| 5,358,199 | 10/1994 | Hayes et al. | 340/973 |
| 5,359,890 | 11/1994 | Fulton et al. | 340/973 |
| 5,408,413 | 4/1995 | Gonser et al. | 244/182 |
| 5,412,382 | 5/1995 | Leard et al. | 340/974 |
| 5,414,631 | 5/1995 | Denoize et al. | 340/963 |
| 5,445,021 | 8/1995 | Cattoen et al. | 244/186 |
| 5,450,323 | 9/1995 | Maupillier et al. | 345/173 |
| 5,475,594 | 12/1995 | Oder et al. | 340/971 |
| 5,508,928 | 4/1996 | Tran | 342/13 |
| 5,510,991 | 4/1996 | Pierson et al. | 244/178 |
| 5,519,392 | 5/1996 | Oder et al. | 340/995 |
| 5,560,570 | 10/1996 | Pierson et al. | 244/195 |
| 5,574,647 | 11/1996 | Liden . | |
| 5,606,657 | 2/1997 | Dennison et al. | 395/501 |
| 5,608,392 | 3/1997 | Faivre et al. | 340/967 |
| 5,617,522 | 4/1997 | Peltier | 395/133 |
| 5,675,327 | 10/1997 | Coirier et al. | 340/973 |
| 5,797,562 | 8/1998 | Wyatt | 340/973 |
| 5,808,563 | 9/1998 | Ching et al. | 340/974 |

OTHER PUBLICATIONS

Description of Collins Pro Line 21 Cockpit Instrumentation, 3 pgs.

Ditter, Al. "An Epic in the Making", *Commuter World*, Dec. 96–Jan. 97, pp. 16–21.

"Collins Tests 3–D Free–Flight Awareness Display", *Flight International*, Jan. 1997, p. 19.

George, Fred, "Introducing Primus Epic", *Business & Commercial Aviation*, Nov. 1996, Nov. 1996, pp. 116–120.

George, Fred, "Primus Epic Features Evolution of Integrated Systems Plus Concepts Pioneered for B–777", *Show News NBAA '96*, Nov. 10, 1996, 1 pg.

George, Fred, "Flying the Future of Avionics Today; Primus Epic Makes Converts at Show", *Show News NBAA '96*, Nov. 21, 1996, p. 16.

Holahan, James, "LCDs, Mice on the Flight Deck!", *Aviation International News*, Midland Park, Nov. 1, 1996, pp. 56–58.

(List continued on next page.)

*Primary Examiner*—Brent A. Swarthout
*Attorney, Agent, or Firm*—Finnegan, Henderson, Farabow, Garrett & Dunner, L.L.P.

[57] ABSTRACT

An aircraft display and control system includes a primary flight director and a head-up display. A flight management system computer generates a current aircraft velocity vector reticle, a desired aircraft velocity reticle, a speed reticle, an acceleration reticle, and a pitch reticle. The flight management system computer conformably generates a waypoint icon in the pilot's view through the windshield superimposed upon the position in the view of the geographic location and altitude of the actual waypoint.

6 Claims, 7 Drawing Sheets

OTHER PUBLICATIONS

Holahan, James, "Honeywell's Primus Epic: avionics for the millennium", *NBAA Convention News*, Orlando, FL, Nov. 20, 1996, p. 22.

Product Review entitled "New Glass for the Glass Cockpit", 2 pgs.

Nordwall, Bruce D., "Collins Pro Line 21 Features Adaptive Flight Displays", *Aviation Week & Space Technolgy*, Nov. 18, 1996, pp. 63–66.

North, David M., "Gulfstream 5 Sets Pace for Long–Range Bizjets", *Aviation Week & Space Technology*, Apr. 28, 1997, pp. 46–51.

Phillips, Edward H., "Learjet 45 Avionics Includes EICAS Display", *Aviation Week & Space Technology*, Sep. 22, 1997, p. 72.

Proctor, Paul, "Epic Avionics in Flight Test", *Aviation Week & Space Technology*, Sep. 22, 1997, p. 70.

Scott, William B., "Pentium Powers 'Epic' Integrated Avionics", *Aviation Week & Space Technology*, Nov. 18, 1996, pp. 67–69.

Scott, William B., "Need for Value Sparks Avionics Revolution", *Aviation Week & Space Technology*, Oct. 4, 1995, 2 pgs.

Trautvetter, Chad, "Next–century Avionics—Honeywell's Primus Epic will change the way pilots work in the cockpit", *Professional Pilot*, Nov. 1996, pp. 96–102.

"Pro Line 21 development driven by human factors", *Vantage Point*, vol. 2, No. 4, 3 pgs.

Weisberger, Harry, "Collins readies new avionics in a hurry", *Show News NBAA '95*, Sep. 26, 1995, pp. 15–16.

HUD SYMBOLOGY

APPARATUS AND METHOD FOR AIRCRAFT DISPLAY AND CONTROL INCLUDING HEAD UP DISPLAY

BACKGROUND OF THE INVENTION

1. Field of the Invention

The invention relates generally to aircraft control and, more particularly, to an improved aircraft control interface.

2. Description of the Related Art

Since the days of the Wright brothers, aircraft pilots have been faced with two major tasks. First, the pilot must accurately determine and constantly be aware of the current aircraft status, including location, direction, speed, altitude, attitude, and the rate of change of all of the above. Second, the pilot must be able to quickly and accurately control the aircraft to bring about a change in the above parameters to achieve a desired status of aircraft. In the early days of aviation, the first task was achieved by pilot awareness of visual and tactile stimulation. That is, the pilot looked around to see where he was, felt the wind pressure, and kept aware of acceleration forces pressing his body into the seat and around the cockpit. The second task was achieved by manually operating a mechanical pulley and lever arrangement to bend and pivot the horizontal and vertical control surfaces of the aircraft.

Initial developments to make the pilot's job easier included the provision of a magnetic compass to provide an indication of direction and pneumatic and mechanical instruments including altimeters, turn-and-bank indicators, etc., to provide indications of aircraft altitude and attitude. Subsequent refinements of these early instruments provided more accurate indications of location and altitude through the use of instruments and flight parameter displays such as gyrocompasses and flight directors. Various types of radio signals provided even more accurate determination of the aircraft location through the use of devices such as automatic direction finders (ADF), distance measuring equipment (DME), VORTAC, LORAN, and inertial reference systems (IRS).

Increases in aircraft performance over the years also increased the pilot's workload. To deal with this workload increase, various types of automation were introduced into the cockpit. One device, known as an automatic pilot (autopilot or AP) relieves the pilot of the necessity to provide continuous hands-on input to the control stick or yoke. When activated while the aircraft is in a stable configuration flying at a constant altitude, speed, and heading, the autopilot will sense the tendency of the aircraft to deviate from the established configuration and will automatically generate inputs to the control surfaces to return and maintain the aircraft in the preset configuration. This configuration will be maintained even in the face of changing wind conditions. More elaborate autopilots permit the pilot to enter data commanding a change in aircraft status, such as a command to climb to a pre-set altitude or turn to a preset heading.

Another type of automation provided in modern cockpits is the automatic throttle (autothrottle, or AT). The autothrottle will maintain a preset aircraft speed by varying the power setting on the engines as the aircraft climbs or descends.

Although the present state of aircraft display and control systems has provided a vast improvement over the systems of previous eras, significant shortcomings still exist with respect to the goal of providing the safest possible aircraft operation. Many of these shortcomings relate to the vast proliferation of data which is supplied to the pilot and to the inefficient way in which this data is provided. For example, many cockpits have literally hundreds of warning lights scattered all over the cockpit. Furthermore, pilot input devices for specific functions are often dispersed in widely separated positions with insufficient thought given to pilot convenience. In addition, automated systems may provide increased convenience and efficiency in one area but increased pilot workload in another. For example, flight management systems often require large amounts of time to tediously enter desired waypoints and related parameters through a keyboard. Furthermore, this massive data entry process provides increased possibilities of error, sometimes with disastrous consequences. For example, improperly entering initial data into FMS at the beginning of a flight leg may have been a source of error leading to the disastrous course deviation and subsequent shooting down of Korean Airlines Flight 007.

Although automation in the cockpit can reduce the pilot's workload, thereby increasing safety, a countervailing consequence of increasing automation is a tendency to increase a pilot's sense of isolation from intimate control of the aircraft. To the extent the pilot does not have complete and continuous knowledge of the functions of the automated systems of the aircraft, there is a tendency for pilots to initiate undesirable control inputs which conflict with the inputs the aircraft is receiving from the automated systems, thereby compromising safety.

In view of the above considerations, it is desirable to provide an improved flight information and control system which permits increased pilot awareness and improved safety.

SUMMARY OF THE INVENTION

Additional features and advantages of the invention will be set forth in the description which follows, and in part will be apparent from the description, or may be learned by practice of the invention. The objectives and other advantages of the invention will be realized and attained by the apparatus and methods particularly pointed out in the written description and claims hereof, as well as the appended drawings.

To achieve these and other advantages, and in accordance with the purpose of the invention as embodied and broadly described, the invention consists of an aircraft attitude direction indicator comprising a flat-panel color display device, a flight director reticle displayed on the display device indicating a desired aircraft velocity vector; and a flight path reticle displayed on the display device indicating a current aircraft velocity vector.

In another aspect the invention consists of a method for displaying information to an aircraft pilot, comprising the steps of receiving operator-entered inputs specifying a desired flight path, generating first display signals representative of a desired aircraft velocity vector from the operator-entered inputs, generating second display signals representative of the current aircraft velocity vector; and simultaneously displaying on a flat-panel display device current and desired aircraft velocity vector symbols respectively generated from the first and second display signals.

In a further aspect, the invention consists of a display system for an aircraft having apparatus for determining current aircraft position, altitude, and attitude. The system comprises a memory for storing a waypoint database including waypoint location and altitude, a head-up display device receiving indicator signals and using the indicator signals to generate a conformal indicator image superimposed on a pilot's view through the cockpit windshield, and a flight computer. The flight computer receives a designation of the next waypoint to which the aircraft will approach; generates indicator signals specifying the relative location within the indicator image of an icon representing the next waypoint, using waypoint location and altitude data for the designated waypoint and data representing the current aircraft position, altitude, and attitude, and supplies the generated indicator signals to the head-up display. An icon specifying the next waypoint is thereby superimposed on the corresponding geographic location in the pilot's view.

It is to be understood that both the foregoing general description and the following detailed description are exemplary and explanatory and are intended to provide further explanation of the invention as claimed.

The accompanying drawings are included to provide a further understanding of the invention and are incorporated in and constitute a part of this specification, illustrate one/several embodiment(s) of the invention and, together with the description, serve to explain the principles of the invention.

BRIEF DESCRIPTION OF THE DRAWINGS

The accompanying drawings, which are incorporated in and constitute a part of this specification, illustrate embodiments of the invention and, together with the description, serve to explain the objects, advantages, and principles of the invention.

In the drawings.

DETAILED DESCRIPTION OF THE PREFERRED EMBODIMENTS

Figure 1:
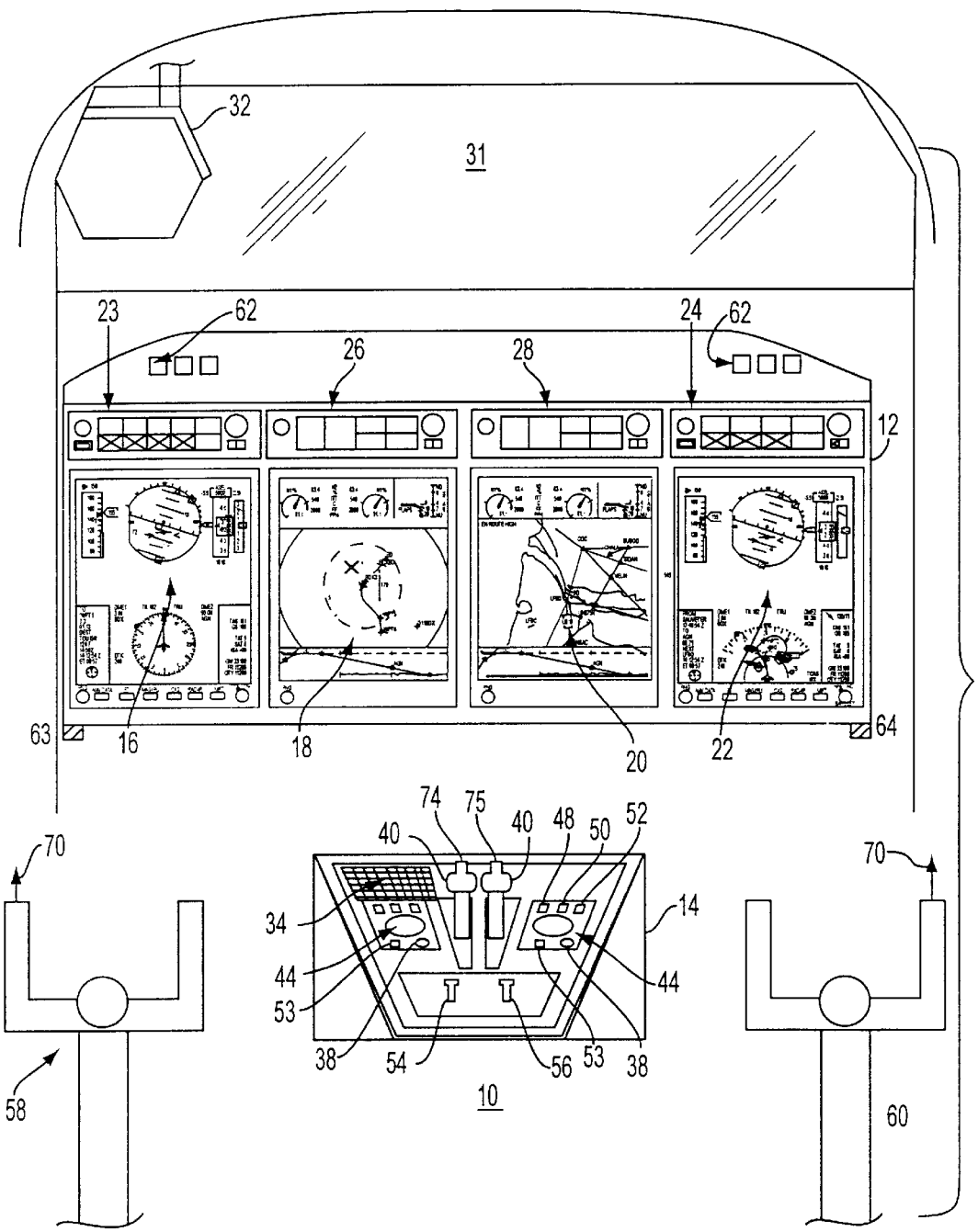
FIG. 1 is a diagram of a flight deck which embodies the present invention.

Referring now to the drawings, FIG. 1 is a diagram of a flight deck 10 for a twelve-passenger twin-engine business jet which embodies the present invention. Flight deck 10 includes an instrument panel 12 and a pedestal 14. Instrument panel 12 includes four 6×8 inch color LCD screens 16,18,20,22. An Autopilot/Autothrottle (AP/AT) controller 23, 24 and a Multi Function Control Unit (MFCU) 26, 28 are each located above one of the screens 16,18,20,22.

A glare shield 30 is located above the control units 23,24,26,28. Above glare shield 30 and superimposed on the captains' view through a windshield 31 is a Head-up Display (HUD) area 32. Outboard screens 16 and 22 each constitute a Primary Flight Display (PFD). Thus, each pilot has a PFD facing him, with AP/AT controller located above the PFD. All flight information and short-range information is therefore located in the pilot's vertical line of sight to the view through the windshield.

Inboard screens 18 and 20 each constitute a Multi-Function Displays (MFD). Each MFD is located in front of pedestal 14, with one MFCU 26 or 28 above each MFD. Both captain and first officer can use both MFDs, which only require coordinated management. This display configuration allows take-off with one MFD out of order.

Instrument panel 12 also includes standby instruments (not shown). The standby instruments may be of conventional type, such as an altimeter, airspeed indicator, attitude indicator, and ILS glide slope/localizer indicator. Alternatively, they could be implemented as flat panel electronic instruments. These instruments are meant only as a back-up to the screen displays.

Pedestal 14 is located between the pilots' seats and has been intentionally reduced in width over the prior art, so as to give better visibility on all screens and to facilitate communication between pilots. Pedestal 14 includes the following controls:

A QWERTY keyboard 34 for each pilot, which includes the alphabet, numbers from zero to nine, one touch +/−, decimal, CLR, ENT, SHOW, SPACE, "/", INCREASE and DECREASE keys;

A five-position switch 38 to access check-lists;

Two independent power levers 40, with thrust reverser controls, which include the AT disconnection switches 74 and the Take off/Go around (TOGA) palm-switches 75; Two trackballs 44, one for each MFD, which each include four special pushbuttons: "Click" 48, "Centered" map 50, "Menu" 52, and "Plus/Minus" 53 (trackballs 44, 46 could also be implemented as a touch-pad, joystick, or other type of cursor control); a lever 54 for speed brakes with three positions (0°, medium, fully extended); and a lever 56 for flaps/slats with four positions (0°, 10°, 20° and 40°).

Keyboards 34, trackballs 44, and switches 48, 50, 52, and 53 provide pilot input to a flight management system (FMS) which performs conventional FMS functions as well as improved functions to be described in greater detail.

The captain's area is fitted with a control yoke 58 including several fast-access controls to be described in detail below. Yoke 58 is the conventional type control handle to receive manual pilot inputs to modify control surfaces of the aircraft and alter the attitude of the aircraft. The first officer's area is fitted with a similar control yoke 60.

Flight deck 10 also includes a simplified upper panel (above the windshield, not shown), which includes only fire panel and lights controls. Lateral panels (not shown) only consist of an oxygen control panel and a disk or CD-ROM driver which gives the capability to load data into the avionics system, such as flight plan, navigation log, radio management. Everything that is necessary for flight is set in front of the pilots' seats and on narrow pedestal 14.

The flight deck is also fitted with three "master caution" lights 62 above each PFD, a reconfiguration box 63 at the bottom left of the captain's PFD, and a reconfiguration box 64 at the bottom right of the copilot's PFD.

Figure 2:
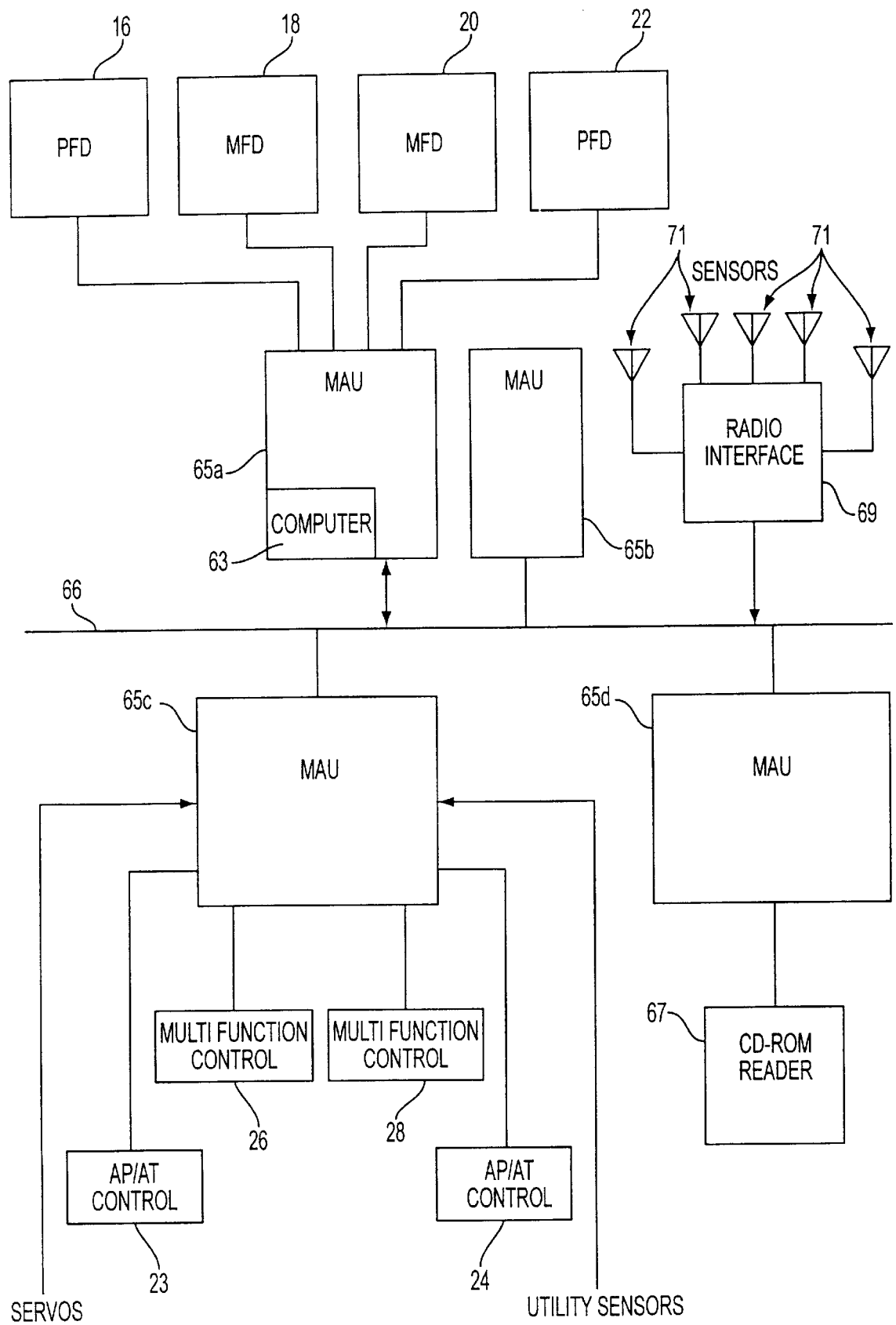
FIG. 2 is an electrical schematic diagram of the components of the flight deck of FIG. 1.

FIG. 2 shows a simplified electrical schematic diagram of flight deck 10. All components of flight deck 10 are preferably implemented as modules of modular avionics units (MAU) 65a–65d interconnected by a high-speed communications bus 66 such as the Avionics Standard Communications Bus of Honeywell. An example is the EPIC system commercially available from Honeywell. Primary processing power of each MAU 65 is provided by a microprocessor, such as a Pentium processor. MAU 65a contains a processor functioning as a flight management system computer 63, including graphics drivers for LCD screens 16, 18, 20, 22. MAU 65b contains communications modules for sensors 71 such as GPS, ADF, VOR, ILS, and MLS receivers and VHF and HF communications transceivers. The sensors themselves are connected to bus 66 via a radio interface unit 69. MAU 65c contains modules for autopilot servos, AP/AT control units 23, 24, MFCUs 26, 28, and aircraft utility sensors. MAU 65d contains memory modules for storing databases and for data input units such as a CD-ROM reader 67.

Other electrical configurations may of course be employed depending on the specific application, as is well-known to those skilled in the art. For example, the electronic components of the flight deck may be implemented in point-to-point architecture, such as the Pro-Line System available from Collins Radio.

Control Yoke

The control yokes 58 and 60 for the captain and the first officer are mounted on control columns of conventional design. The control columns are pivotally hinged to allow fore and aft movement, and the yokes are rotatable left and right. The fore and aft movement of the control column is transmitted to the elevator surfaces to control the pitch attitude of the aircraft, and the rotation of the yoke is transmitted to the ailerons to roll the aircraft. Mechanical, hydraulic, or electrical connections may be used to connect the movement of the pilot controls to the control surfaces. Alternatively, a stick or side stick controller able to pivot along two axes can replace the control column and yoke.

Several electrical controls are mounted on the yoke or stick. Conventional controls (not shown) include a push-to-talk switch to activate communications radio transmitters, a push-button autopilot disconnect switch, and switches to electrically trim the aircraft. A five-position multi-axis control switch 70 is also included. Switch 70 is mounted on yoke 58 and 60 and is thumb activated. This switch is used to increase and decrease the value of the heading and the flight path slope followed by the autopilot a manner to be described later in greater detail. Sideways motion changes the heading, and fore/aft motion changes the slope. Pressing the switch in its central position generates an ENABLE signal which selects which course and slope is followed by the A/P. Further details of multiaxis switch 70 are given in the section discussing the autopilot.

Navigation Sensors

Flight deck 10 uses receivers for the NAVSTAR and GLONASS global positioning system satellites (GPS) and inertial reference sensor (IRS) platforms as principal navigation sensors. GPS receivers compute the aircraft's position from radio signals transmitted from a constellation of satellites. To provide greater accuracy, for example, when an aircraft is landing in poor visibility, differential GPS (D-GPS) is employed, using a separate receiver to receive correction information from a ground station to increase the accuracy of the position solution derived from satellite signals.

Another navigation sensor is the IRS, which employs sensitive gyroscopes to measure the acceleration of the aircraft along three axes. By knowing the point of departure and the magnitude and duration of acceleration in a given direction, the IRS can compute the current location of the aircraft.

Traditional navigational aids ("navaids") are also used to supplement GPS and IRS. These typically consist of various types of ground-based radio stations which transmit signals carrying encoded information, and an airborne receiver which interprets the information. These range in complexity and cost from the automatic direction finder (ADF) which points towards a single non-directional radio beacon on the ground, to LORAN which uses a worldwide chain of transmitters to give exact location of the aircraft. VOR, VORTAC, and VOR/DME give a bearing from a known station, and with the appropriate equipment also give the distance from the station. ILS (instrument landing system) and MLS (microwave landing system) use specialized transmitters located at many airports to enable landing in poor visibility. All the traditional navaids require ground transmission stations which are expensive to maintain and operate, and several are likely to be phased out in the future.

In instrument panel 12, all navigation sensors, including VOR/DME, GPS, ADF, ILS, MLS, IRS, LORAN, etc., are coupled to the system via bus 66 and are provided as inputs to the FMS computer 63, residing as a module in MAU 65a. The FMS thus becomes the sole navigational interface with the pilots, and conventional navigation aid receivers such as the VOR/DME receiver become simple sensors for the FMS, without providing direct pilot access to the deviation from a VOR radial as in a conventional FMS. Guidance on a VOR radial remains possible through the FMS by choosing the VOR as a "TO" waypoint and by selecting a desired track to that waypoint. The sensor that will provide guidance information in this particular case, however, will be GPS, if serviceable. Nevertheless, in addition to the permanent bearing indication from the FMS, VOR and ADF, bearings can be displayed on the PFD in order to survey an FMS procedure. Both pilots can access the VOR, DME, and ADF. Alternatively, it may be preferred to provide access for precision approach sources (DGPS, ILS, MLS, etc.) direct to the autopilot and display devices.

Communications Transceivers

Two VHF radio transceivers are provided, COM1 and COM2, in addition to the HF radio transceivers. Additional VHF transceivers may be provided. These transceivers (not shown) can be tuned manually, or can be tuned by "pointing and clicking" with trackball 44 on a frequency in a digital map displayed on the MFD or the PFD.

A radar transponder is also provided. It is used to amplify and encode a signal returned to a ground-based radar, so that the ground controller can identify the radar return from a code issued to the pilot and entered in the transponder. The altitude of the aircraft is also sent back to the radar, to facilitate aircraft separation.

Satellite communication (SATCOM) may also be provided, to permit telephone, fax, and other types of data transfer from and to the aircraft, by way of orbiting satellites.

DISPLAY SCREENS

PFD

Figure 3:
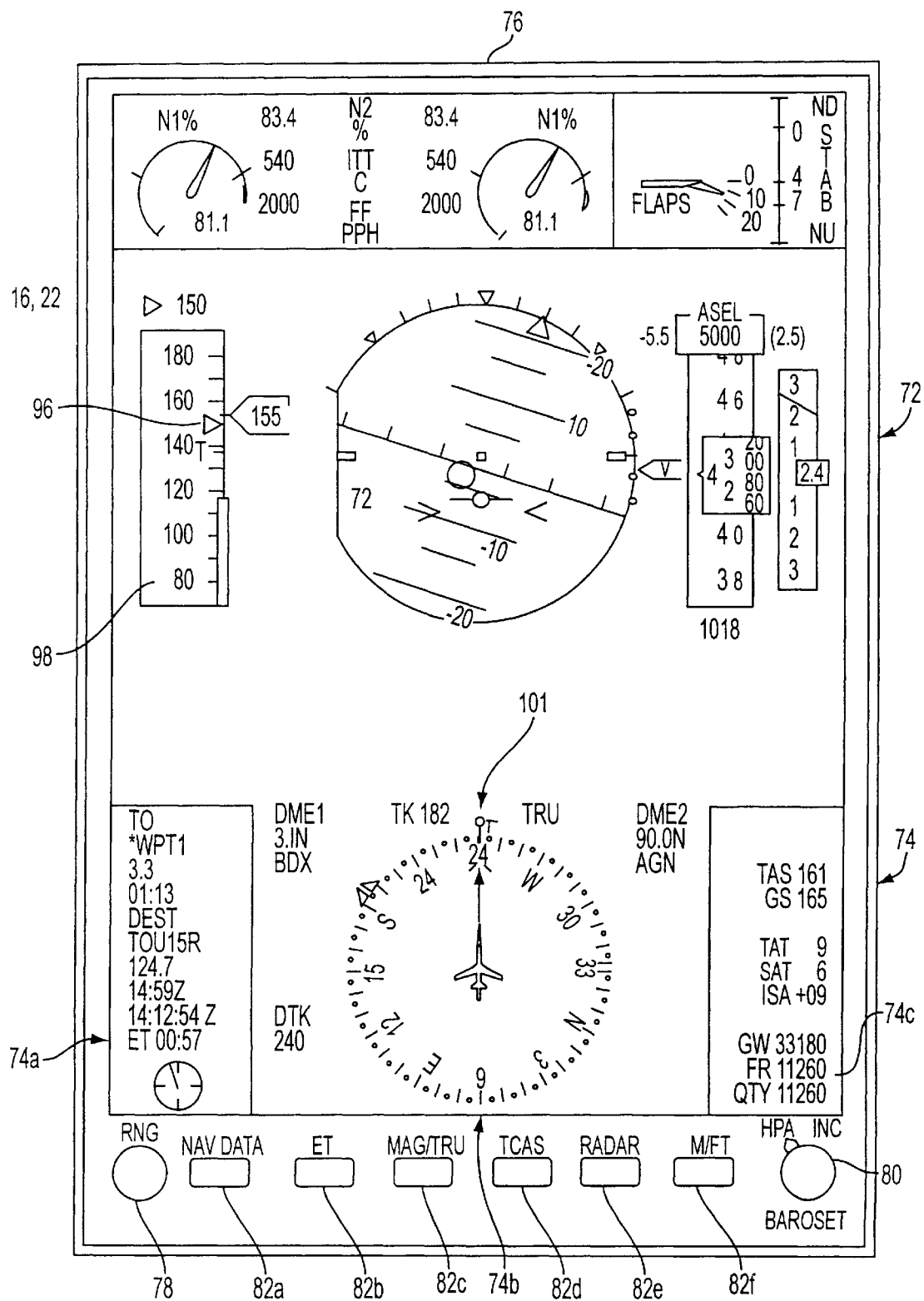
FIG. 3 is a drawing of the display window of the Primary Flight Display (PFD) PFD of FIG. 1, with the "full rose" format.

Most of the information provided to the pilots in flight deck 10 is displayed on PFDs 16, 22 and MFDs 18, 20. Each PFD is driven by a graphical driver and processing module located in MAU 65a. Preferably, it encompasses at least a 6×8 inch color liquid crystal display (LCD) screen. As shown in FIG. 3, each PFD principally displays an attitude direction indicator (ADI) 72 in the middle part of the screen and horizontal situation indicator (HSI) 74 in the lower part. Basic engine parameters are also displayed in an engine area 76 (upper portion) in case of a MFD failure.

Two rotary knobs 78, 80 and six push-buttons 82a–82f are located at the bottom of each PFD. Knob 78 is a "RANGE" rotary knob to adjust the range scale of the HSI in preset increments, and includes a push-to-toggle function to switch between map and plan display formats of PFD 16,22. Knob 80 is a "barometric setting" knob to enable baroset adjustments to the altimeter. Button 82a labeled "NAV DATA" provides display of a navigation data screen in a manner to be described later in greater detail. Button 82b labeled ET provides elapsed time functions on a chronometer. Button 82c labeled "MAG/TRU" switches between magnetic and trueheading or track reference on all displays. Button 82d displays TCAS symbology in place of the current horizontal situation format on HSI 74. Button 82e labeled "RADAR" displays a weather-radar image on HSI 74, and button 82f labeled "M/Ft" selects an additional altitude display expressed in meters. If preferred, some or all of buttons 82a–82f may be implemented as menu choices or soft keys.

Figure 4:
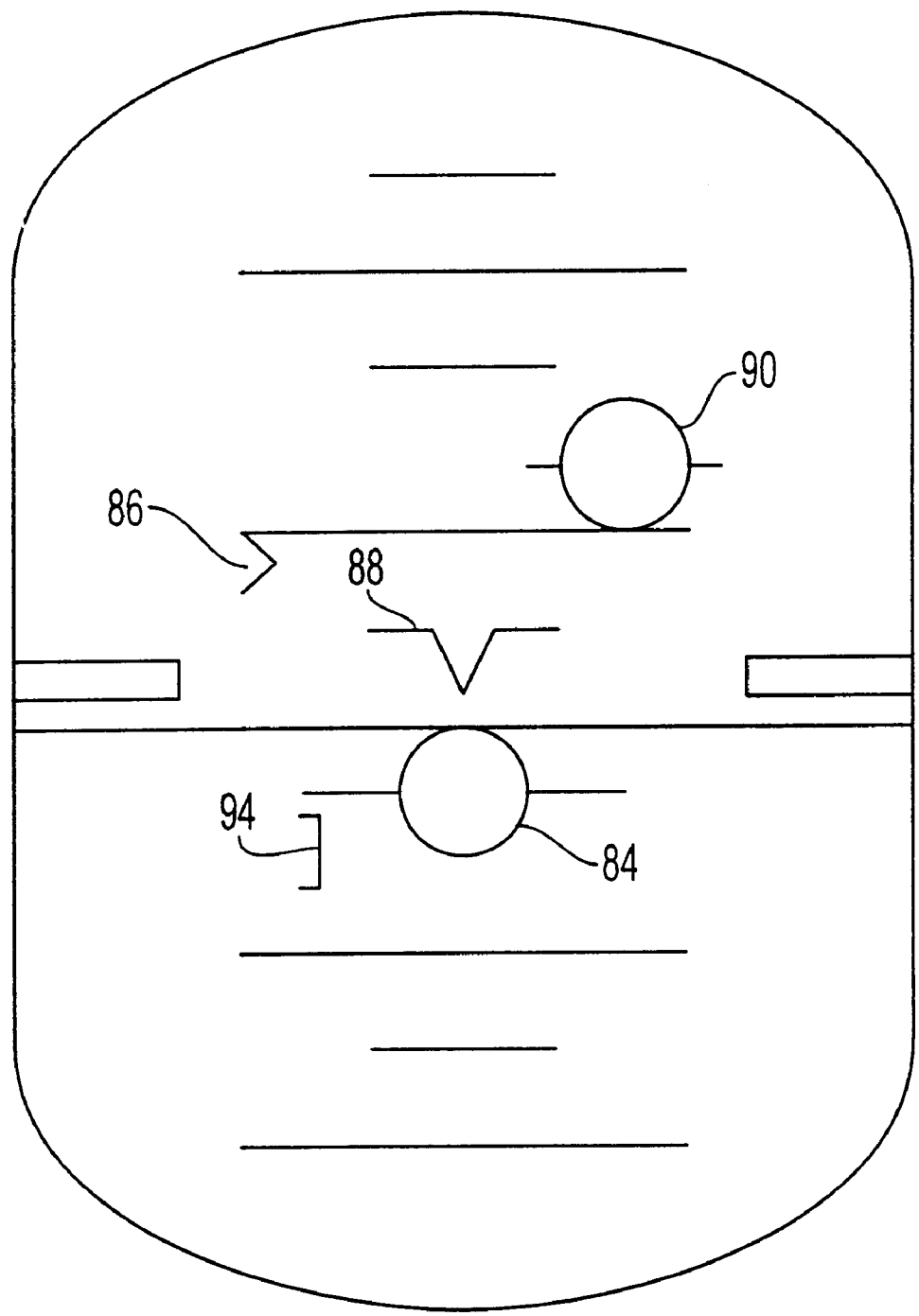
FIG. 4 is a detailed drawing of the attitude direction indicator of the PFD of FIG. 4.

ADI 72 displayed in PFD 16, 22 and shown in more detail in FIG. 4 displays conventional information, but further includes an aircraft velocity vector (flight path angle) reticle 84, an "acceleration rate along path" reticle 86, pitch reticle 88, a flight director reticle 90 showing desired aircraft velocity vector, and a speed reticle 94. As set forth below, these reticles provide the capability to fly the aircraft using slope (path) guidance instead of pitch, in the same manner as conventional HUD symbology.

Figure 6:
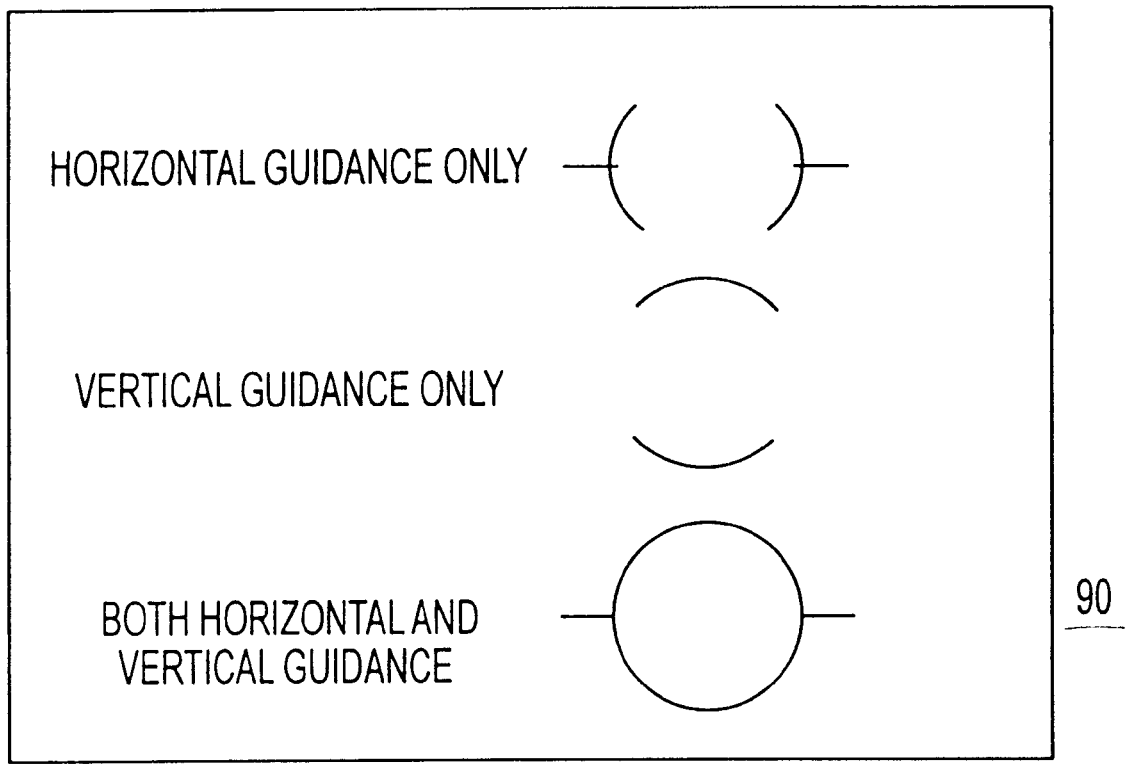
FIG. 6 is a drawing of the flight director symbol.

Referring to the drawing of FIG. 4, a flight director reticle 90, which is computed by the autopilot function of computer 63 and can be displayed on PFD 16,22 and on the HUD 32, is a representation of the desired aircraft velocity vector, that is, the desired flight path angle, as calculated by the autopilot and indicating the pitch and roll commands necessary to achieve the desired aircraft trajectory, or slope. As shown in more detail in FIG. 6, reticle 90 consists of two reticles, each one made of a pair of quarter-circles. One reticle is devoted to the vertical. Those are always displayed magenta. FPA reticle 84 must be set within the quarter-circles for the guidance to be followed correctly. Reticle 90 is always displayed if the AP is coupled or if a higher mode of the AP is selected and is active. The shape of flight director reticle 90 is identical in both PFD 16,22 and HUD 32.

Flight path angle (FPA) FPA reticle 84 consists of stylized aircraft symbol which shows the slope of the current path of the inertial velocity vector of the aircraft, as supplied by the inertial reference system (IRS). Lateral deviation of this reticle due to slip-skid or to drift is neither computed nor displayed in this reticle. To maintain coordinated flight by adjusting the slip angle β to zero manually with rudder control, a classical slip-skid indicator (not shown) remains available at the top of ADI 72.

Acceleration reticle 86 consists of a chevron ">" which moves vertically on an imaginary line running from top to bottom of ADI 72. It provides an analog indication of acceleration rate along the flight path.

Speed reticle 94 provides speed guidance during flight phases such as the approach. It consists of a bracket] on the left of FPA reticle 84. To hold the desired speed, the pilot aligns the FPA reticle 84 with bracket 94. The difference in vertical position of reticle 94, above or below reticle 84, indicates the error between current speed and desired speed, as specified by the FMS. In addition, alignment of longitudinal acceleration chevron 86 with reticle 84 and 94 ensure that the speed will remain constant. Of course, the required speed depends on aircraft's configuration, and will be manually set by pilot using the autothrottle (AT). The pilot can refer to parameters computed by the FMS to compute a required landing speed ($V_{ref}$), given the approach slope, aircraft weight, temperature on ground, and flaps configuration. A corresponding cyan colored bug (marker) 96 is displayed on an air speed indicator tape 98 (FIG. 3). The pilot simply selects the desired speed value on AT control 23, 24, and the system will provide him with the corresponding bracket 94 in ADI display 72.

HSI 74 (FIG. 3) displays short-range navigation information in the lower portion of PFD 16, 22. It is divided in three areas, which are a "left window" 74a, a "pure horizontal situation" 74b, and a "right window" 74c.

The "left window" provides FMS navigation information which can be displayed in two different formats. First is a "TO-DEST" format, shown in FIG. 3, displaying a "TO" waypoint with its name, distance and time to go to next waypoint, plus "DEST" airport with name, distance and ETA. Second is a FROM/TO/NEXT format displaying the name of these three points plus the time of overflight of the "FROM" waypoint and the expected arrival time at the "TO" waypoint. The pilot can toggle between both formats using the "NAV DATA" push-button 82a at the bottom of PFD.

The "left window" also provides the present time, in magenta, and a chronometer with analog and digital values, only used to compute elapsed time. A first push on the "ET" push-button 82b makes the chronometer appear and start from zero. A second push stops it. A third push restarts it from zero.

The "pure horizontal situation" area 74b is located at the center of HSI 74 and can be displayed in three different formats. FIG. 3 shows the first format, which is a "full rose" format (conventional HSI symbology) displaying a full 360 degree compass rose centered on an aircraft symbol. On request, bearings to selected points can be displayed in the rose. FMS or ILS Course/deviation is always displayed as a bug 101 while in this format. The ILS course deviation is displayed when a precision approach is selected on the AP controller, or when an ILS frequency and course are manually tuned. ILS course deviation can also be automatically selected when passing within 30 miles of the initial approach fix (IAF).

Figure 5:
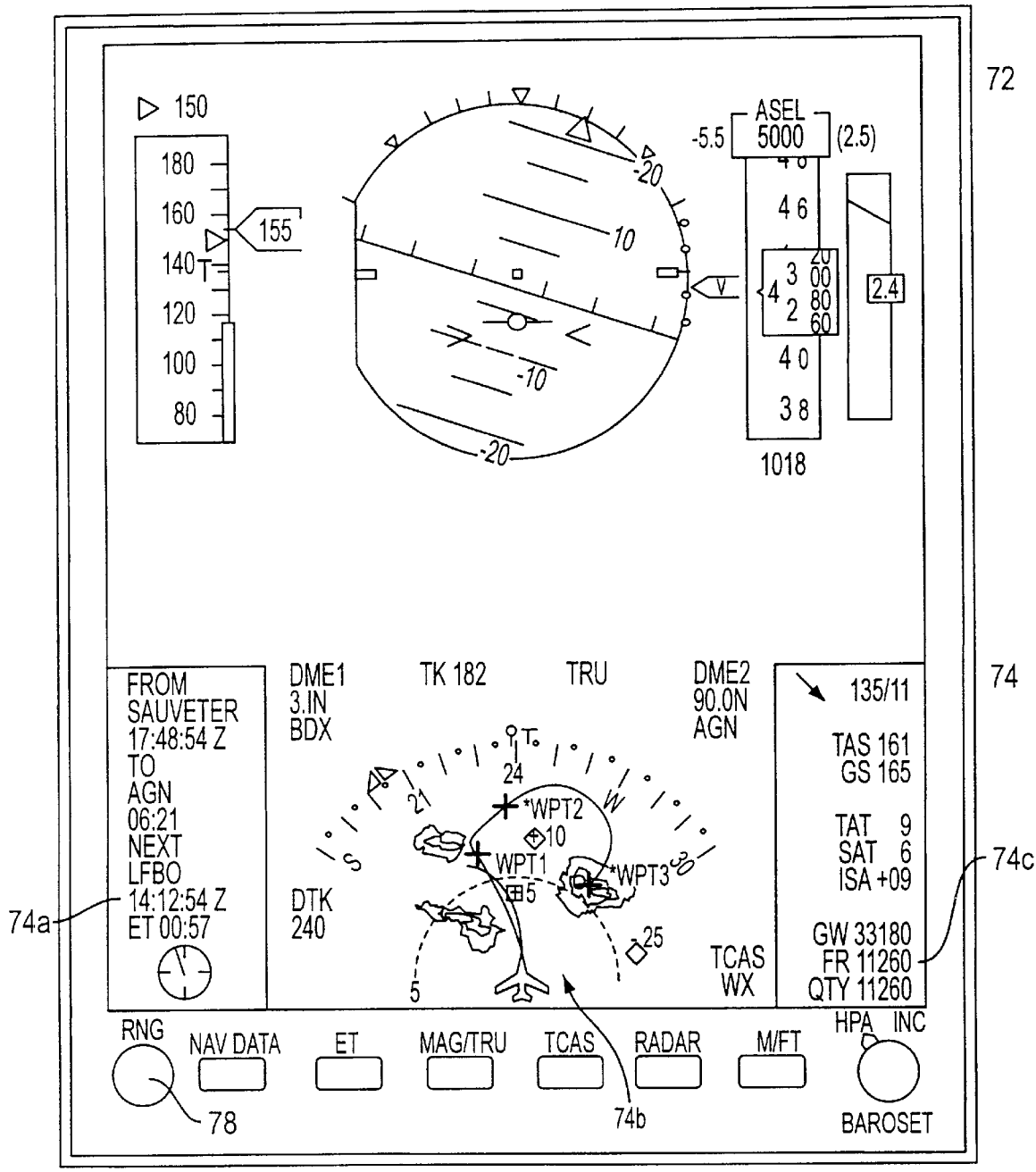
FIG. 5 a drawing of the display window of the PFD of the flight deck of FIG. 1, with the "arc" format.

The second HSI format is an "arc" format, which displays a +/−60 degrees sector in front of the aircraft and is shown in FIG. 5. This format provides the position of waypoints that are inside the selected range-scale entered with rotary knob 78 at the planned path of the FMS flight plan. FMS bearing and course deviation are always displayed in this format.

Area 74b will display the full Traffic Collision Avoidance System (TCAS) format either automatically in case of traffic alert or by pressing the "TCAS" push-button 82d. The TCAS display is a full 360 degree rose centered on the aircraft. The range of the TCAS display can be adjusted using the rotary knob 78 on the left bottom of PFD16, 22. A second pressing of the "TCAS" push-button 82d of the PFD calls back the previous HSI format.

VOR and ADF bearings can be displayed on the PFD in addition to the bearing indication of the FMS, as a backup. Both pilots can access the VOR, DME, and ADF.

ILS approaches and differential global positioning system (D-GPS) are some of the approach options of the FMS functions of computer 63. Both are automatically set up by computer 63 without requiring pilot entry of frequencies, except in abnormal operations, when it is possible to manually tune an ILS frequency and course by using the MFCU.

In addition, the pure horizontal situation area 74b of HSI 74 displays the following information: distances to DME 1 & 2 with name of these radio navigation aids, labels indicating the radio navigation aid represented by each needle, a label indicating which of MAG/TRU references is used, desired track or preselected track symbol when the AP is in the corresponding mode, and current track.

The "right window" 74c of HSI 74 provides: air data computer (ADC) information, including TAS, TAT, SAT, ISA and GS; weights, including GW, FR and QTY; wind direction and velocity; and landing runway elevation, which starts flashing when passing TOD to remind the pilot to check the pressurization system. Power-up value of landing runway elevation is 0 (sea level), but the pilot can modify it. If the pilot does not modify the zero value when passing to within 30 Nm of the destination airport, the value of the destination airport runway elevation from the stored data base is automatically displayed and flashes for 10 seconds. The pilot can subsequently modify this value.

All information in this window is permanent, except landing elevation which is displayed only once when manually entered, or when a destination airfield is selected and the aircraft is less than 200 miles from the destination.

MFD

In prior art flight decks, the aircraft crew was required to manage the flight and perform path modification by using the control and display unit (CDU) of the FMS, which involved manually typing in desired waypoints and other data. This was a boring, fastidious task, which could affect safety in unpredictable ways, to the point that some aircraft operators prohibited the use of the CDU below an altitude of 10,000 ft. (FL100). To remedy this problem, a method to manage the FMS functions by using the MFD has been developed, eliminating the previously existing CDU on the flight management system unit.

The MFDs 18, 20 are truly the "workstations" of the flight deck. They are used for managing the flight, carrying out flight path modification, and checking aircraft systems and sensors availability. The corresponding procedures involve the intensive use of track-ball 44 controlling a cursor of MFDs 18, 20 and, in a less important manner, use of keyboards 34. Alternatively, the functions of keyboards 34 may be replaced by a direct voice input.

An important aspect of the design of MFDs 18, 20 is the ability for each pilot to access both the right MFD 20 and the left MFD 18 from each seat, using a distinctive cursor. However, both MFDs provide the same options and are coupled to synchronized FMS processors.

Both MFDs are synchronized so that, for example, when the captain is working on an enroute high altitude chart on MFD 18, the first officer can work on the same chart in his own MFD 20, using a different range scale or type of format. However, the pilots can also work together on the same page, on the same MFD, each one using his own trackball 44, to move his own cursor, and his own keyboard 34. The principal constraint to joint access of the MFD is that once a modification has been initiated using one cursor, it must be finished with that same cursor.

Access to each MFD 18,20 is implemented by a "cursor skip" function, which selectively permits each cursor to move about each MFD. In the preferred embodiment, the cursor skip function is selectively implemented by trackball velocity. For example, if the captain slowly operates his trackball 44 to move his cursor to the right, the cursor will stop at the right edge of MFD 18 to prevent inadvertently "skipping" to MFD 20. Subsequent slow movement of the trackball to the right will not result in further movement of the cursor. However, rapid operation of the captain's trackball to the right will cause the captain's cursor to "skip over" to MFD 20. The captain can then use his cursor and related buttons to implement any feature available on right-hand MFD 20. Similarly, the first officer can selectively move his cursor to left-hand MFD 18.

The cursor skip function could, of course, be implemented using a selector other than trackball speed. For example, a dedicated push button could be provided, operation of which would be required to permit "cursor skip" to the other MFD. Moreover, the cursor skip function could be implemented over more than two flat panel displays.

The following functions are redundantly included in both screens to permit a flight to depart even if one MFD is inoperable: display engine parameters and warning/caution messages; display all aircraft electrical, fuel, air conditioning, hydraulics systems; display horizontal situation and vertical profile; manage FMS and AFIS; manage normal and abnormal check-lists; and display general maintenance items in flight that can be easily understood by the crew.

The functions of the MFD are founded on the basic idea of displaying desired portions of at least two data bases stored in MAU 65d (FIG. 2), highlighting (or "capturing") specific features of the displayed data with the cursor, and "selecting" the captured features to permit modification of the displayed feature or storing into a flight plan. The first data base is a geographic map data base which provides basic geographic features of a standard paper map, or chart, including terrain elevation. This database, which may be the same as utilized in the Enhanced Ground Proximity Warning Systems (EGPWS), is stored in a first portion of system memory. The EGPWS database is commercially available from the Sundstrand Corporation.

The second database is an aeronautical information database, which includes a complete list of available navigation aids such as VOR, GPS, ILS, MLS, ADF, as well as airports, airways, intersections, reporting points, etc. The aeronautical information database includes locations and frequencies of each navaid. It is obtained from standard sources such as Jeppesen Publications, and is stored in a second portion of system memory.

Head-Up Display

Figure 7:
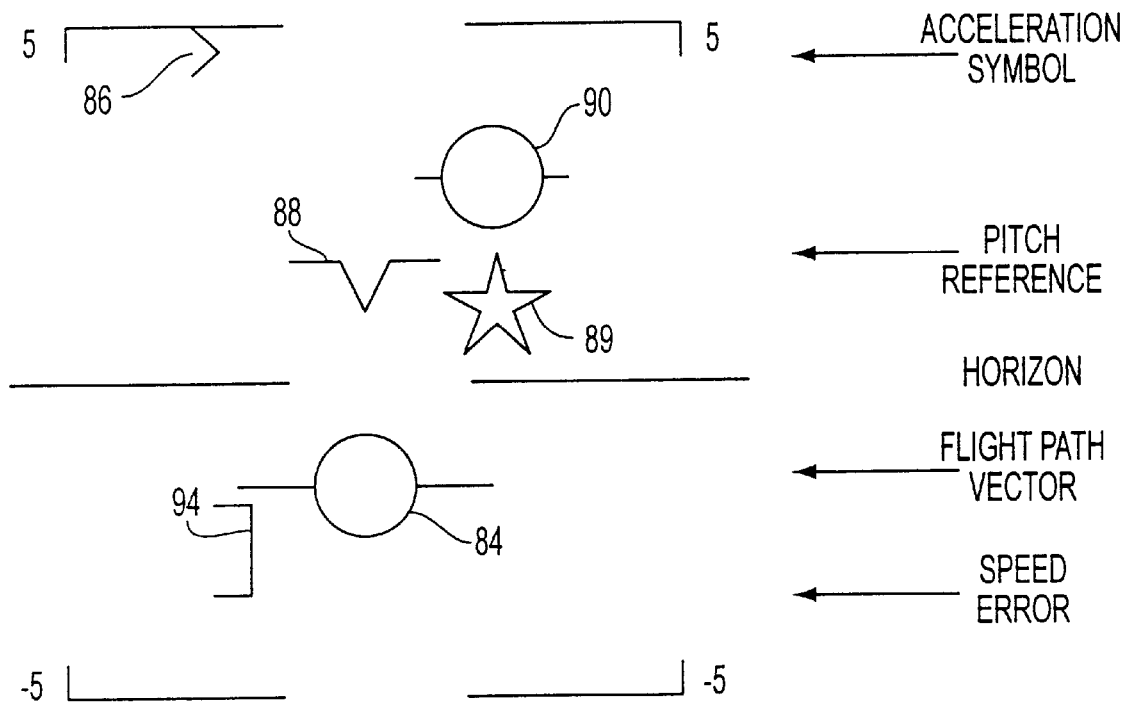
FIG. 7 is a drawing showing the image generated by the head-up display of FIG. 1.

A head up display (HUD) 32 is provided at the captain's station. As shown in FIG. 7, it provides to the pilot the same information which is available from PFD 16, 22 regarding aircraft altitude, speed, flight director, velocity vector and acceleration, using the same symbology as is used in PFD 14, 20. In addition, HUD 32 displays a conformal three-dimension image of the next waypoint in the flightplan. That is, a star-shaped waypoint icon 89 appears superimposed on the pilot's view through the windshield at the actual location and altitude of the next waypoint.

When the autopilot is active and a flightplan has been entered, position and altitude data corresponding to the next waypoint of the flightplan is retrieved by the flight computer 63 from memory, along with data specifying the current position, altitude, and attitude of the aircraft. The computer then generates indicator signals to the HUD producing icon 89 superimposed on the pilot's view through the windshield at the actual position and altitude of the waypoint. If the next waypoint of the flightplan is, for example, a VOR which the flightplan specifies to be overflown at FL 28, the computer retrieves the identification and overflight altitude of the VOR from the flightplan stored in memory and the geographic location from the aeronautical information database stored in memory. The computer then generates and supplies signals to the HUD causing icon 89 to appear at the position in the pilots view corresponding to the specified altitude at the actual location of the waypoint.

It will be apparent to those skilled in the art that various modifications and variations can be made in the disclosed process and product without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A primary flight display, comprising:

a flat-panel color display device;

a flight director reticle displayed on the display device indicating a desired aircraft velocity vector computed by an autopilot from an operator-entered desired flight path and indicating required pitch and roll commands; and a flight path angle reticle displayed on the display device indicating a current aircraft velocity vector.

2. A primary flight display as recited in claim 1, comprising a speed reticle displayed on the display device indicating current speed error compared to a desired value.

3. A primary flight display as recited in claim 1, comprising a pitch reticle displayed on the display device indicating current aircraft pitch attitude.

4. A primary flight display as recited in claim 1, comprising a longitudinal acceleration reticle displayed on the display device indicating acceleration along the current flight path.

5. A primary flight display, comprising:

a flat-panel color display device;

a flight director reticle displayed on the display device indicating a desired aircraft velocity vector; and a flight path angle reticle displayed on the display on the display device indicating a current aircraft velocity vector, wherein the flight director reticle comprises a first reticle including a pair of quarter-circles indicating desired vertical aircraft velocity vector and a second reticle including a pair of quarter-circles indicating desired horizontal aircraft velocity vector.

6. A method for displaying information to an aircraft pilot, comprising the steps of:

receiving operator-entered inputs specifying a desired flight path;

generating first display signals representative of a desired aircraft velocity vector computed by an autopilot from the operator-entered inputs, said first display signals indicating required pitch and roll commands;

generating second display signals representative of the current aircraft velocity vector; and simultaneously displaying on a flat-panel display device a flight director reticle and a flight path angle reticle respectively generated from the first and second display signals.

* * * * *

UNITED STATES PATENT AND TRADEMARK OFFICE
CERTIFICATE OF CORRECTION

PATENT NO.: 6,057,786

DATED: May 2, 2000

INVENTOR(S): Michel BRIFFE et al.

It is certified that an error appears in the above-identified patent and that said Letters Patent is hereby corrected as shown below:

Claim 5, col. 12, lines 1-2, "on the display on the display device" should read --on the display device--.

Signed and Sealed this

Twentieth Day of March, 2001

Attest:

NICHOLAS P. GODICI

*Attesting Officer*      *Acting Director of the United States Patent and Trademark Office*